United States Patent

Robinson et al.

[11] Patent Number: 5,811,063
[45] Date of Patent: *Sep. 22, 1998

[54] MOUNTING MAT FOR FRAGILE STRUCTURES SUCH AS CATALYTIC CONVERTERS

[75] Inventors: John W. Robinson, Hampton, S.C.; Alan R. Lebold, Buffalo; Mark Travers, Ransomville, both of N.Y.

[73] Assignee: Unifrax Corporation, Niagara Falls, N.Y.

[*] Notice: The term of this patent shall not extend beyond the expiration date of Pat. No. 5,580,532.

[21] Appl. No.: 925,228

[22] Filed: Sep. 8, 1997

Related U.S. Application Data

[60] Continuation of Ser. No. 470,995, Jun. 6, 1995, Pat. No. 5,666,726, which is a division of Ser. No. 333,968, Nov. 3, 1994, Pat. No. 5,580,532, which is a continuation-in-part of Ser. No. 51,469, Apr. 22, 1993, abandoned.

[51] Int. Cl.$^6$ .............................. B01D 53/34; F01N 3/10
[52] U.S. Cl. .................... 422/179; 422/180; 422/221; 422/222; 55/DIG. 10; 55/DIG. 30; 60/311
[58] Field of Search ..................... 422/179, 180, 422/221, 222; 501/95.1; 428/116, 114, 593; 55/509, 282, DIG. 30, 466, 523, DIG. 10; 252/62; 60/299, 301, 311

[56] References Cited

U.S. PATENT DOCUMENTS

| | | | |
|---|---|---|---|
| 3,458,329 | 7/1969 | Owens et al. | 428/493 |
| 3,771,967 | 11/1973 | Nowak | 422/179 |
| 3,795,524 | 3/1974 | Sowman | 501/95 |
| 3,876,384 | 4/1975 | Santiago et al | 422/179 |
| 3,916,057 | 10/1975 | Hatch et al. | 428/236 |
| 3,996,145 | 12/1976 | Hepburn | 252/62 |
| 4,159,205 | 6/1979 | Miyahara et al. | 501/153 |
| 4,277,269 | 7/1981 | Sweeting | 65/2 |
| 4,327,145 | 4/1982 | Mitani et al. | 428/290 |
| 4,559,862 | 12/1985 | Case et al. | 87/1 |
| 4,693,338 | 9/1987 | Clerc | 181/231 |
| 4,735,757 | 4/1988 | Yamamoto et al. | 264/119 |
| 4,752,515 | 6/1988 | Hosoi et al. | 428/114 |
| 4,863,700 | 9/1989 | Ten Eyck | 422/179 |
| 4,865,818 | 9/1989 | Merry et al. | 422/179 |
| 4,929,429 | 5/1990 | Merry | 422/179 |
| 4,999,168 | 3/1991 | Ten Eyck | 422/179 |
| 5,028,397 | 7/1991 | Merry | 422/179 |
| 5,032,441 | 7/1991 | Ten Eyck et al. | 428/77 |
| 5,145,811 | 9/1992 | Lintz et al. | 501/95 |
| 5,580,532 | 12/1996 | Robinson et al. | 422/179 |

FOREIGN PATENT DOCUMENTS 1513808  6/1978  United Kingdom .

OTHER PUBLICATIONS

Maret, Gulati, Lambert and Zink, "Systems Durability of a Ceramic Racetrack Converter," International Fuels and Lubricants Meeting, Toronto, Canada, Oct. 7–10, 1991.

Gulati, Ten Eyck and Lebold; "Durable Packaging Design for Cordierite Ceramic Catalysts for Motorcycle Application" Society of Automotive Engineers MMmeeting, Detroit, MII. Mar. 1, 1993.

*Primary Examiner*—Hien Tran
*Attorney, Agent, or Firm*—Renner, Kenner, Greive, Bobak, Taylor & Weber

[57] ABSTRACT

A device for the treatment of exhaust gases such as a catalytic converter, a diesel particulate trap and the like, includes a housing having an inlet at one end and an outlet at its opposite end through which exhaust gases flow; a structure resiliently mounted within the housing, the structure having an outer surface and an inlet end surface at one end in communication with the inlet of the housing and an outlet end surface at an opposite end in communication with the outlet of the housing; and mounting element, disposed between the structure and the housing, for selectively exerting substantially stable mounting pressure against the housing and the structure over a temperature range of from about 20° C. to at least about 1200° C., wherein the mounting element is a flexible mounting mat including an integral, substantially non-expanding sheet comprising ceramic fibers, wherein the fibers are substantially shot free. The mat has flexible, structural integrity. A method of mounting a fragile structure in a device is also provided.

14 Claims, 3 Drawing Sheets

MOUNTING MAT FOR FRAGILE STRUCTURES SUCH AS CATALYTIC CONVERTERS

CROSS REFERENCE TO RELATED APPLICATIONS

This is a continuation application of application Ser. No. 08/470,995 filed on Jun. 6, 1995, now U.S. Pat. No. 5,666,726, which is a divisional application of Ser. No. 08/333,968 filed on Nov. 3, 1994, now U.S. Pat. No. 5,580,532, which is a continuation-in-part application of Ser. No. 08/051,469 filed Apr. 22, 1993, now abandoned.

FIELD OF THE INVENTION

The present invention is directed to catalytic converters, diesel particulate traps and other devices for the treatment of exhaust gases. More particularly, the present invention is directed to a device for the treatment of exhaust gases having a catalyst support structure mounted within a housing which is supported therein by a mounting means having enhanced handleability and fabrication characteristics comprising an integral, substantially nonexpanding composite mat of ceramic fiber for mounting and supporting the support structure.

BACKGROUND OF THE INVENTION

Catalytic converter assemblies for treating exhaust gases of automotive and diesel engines contain a catalyst support structure for holding the catalyst, used to effect the oxidation of carbon monoxide and hydrocarbons and the reduction of oxides of nitrogen, the support structure being mounted within a metal housing. The support structure is generally made of a frangible material, such as a monolithic structure formed of metal or a brittle, fireproof ceramic material such as aluminum oxide, silicon dioxide, magnesium oxide, zirconia, cordierite, silicon carbide and the like. These materials provide a skeleton type of structure with a plurality of tiny flow channels. These structures are very fragile however. In fact, these monolithic structures are so fragile that small shockloads or stresses are often sufficient to crack or crush them.

The support structure is contained within a metal housing, with a space or gap between the external surface of the support structure and the internal surface of the housing. In order to protect the support structure from thermal and mechanical shock and other stresses noted above, as well as to provide thermal insulation, it is known to position at least one sheet of mounting material within the gap between the support structure and the housing. For example, U.S. Pat. Nos. 4,863,700, 4,999,168, and 5,032,441, each of which is incorporated herein by reference, disclose catalytic converter devices having a mounting material disposed within the gap between the housing and the support structure contained in the devices to protect the fragile support structure and otherwise hold it in place within the housing.

However, the conventional mounting materials used in these catalytic converter devices, while suitable for most current automotive catalytic converters, exhibit difficulties when the catalytic converter operating temperature is either very low (20°–300° C.) or very high (750°–1200° C. and above). For instance, when these conventional mounting materials have been used in catalytic converters for vehicles having a higher gross weight than normal gasoline powered passenger automobiles, they have exhibited failure. Because of their high gross vehicle weight, the engines of such vehicles operate at a much higher percentage of their maximum output for a much greater percentage of their operating time, than do the engines in passenger automobiles. These operating conditions in heavier vehicles result in maximum catalytic converter temperatures of much greater than 850° C. In fact, converter monolith temperatures of 1050° C. are not uncommon, and temperatures in excess of 1200° C. may be encountered.

Heretofore, a typical passenger automobile catalytic converter, such as the one shown in U.S. Pat. No. 5,032,441, utilized a ceramic monolith which was supported by an intumescent mounting material having a nominal thickness of about 4.95 mm to about 9.9 mm and a nominal density of about 0.63 g/cm$^3$. This material was compressed during installation of the ceramic monolith into its metallic housing to a nominal thickness of about 3.1 mm to about 6.2 mm and a nominal density of about 1 g/cm$^3$. The conventional intumescent mounting material contains vermiculite which expands at about 300° C. and degrades at temperatures greater than 750° C. Thus, upon the initial heating of the catalytic converter assembly, particularly the initial cycles, conventional intumescent mounting materials experience a tremendous expansion pressure which is capable of crushing the catalyst support structure and causing component failure.

Accordingly, a need exists for maintaining a constant pressure on the metallic housing and the catalyst support structure under all conditions. In other words, a mounting mat which does not expand substantially upon initial heating of the catalytic converter assembly is seen as highly desirable.

While conventional intumescent mounting material meets the needs of most current automotive catalytic converters, it does not meet the needs of several near future requirements as well as some current diesel and heavy duty truck requirements. These requirements are focused upon the maintenance of near constant residual mounting pressure in temperature regimes below 300° C. and above 750° C. Conventional intumescent mounting material cannot provide such a constant pressure at these extreme temperature regimes.

Examples of severe condition applications in which these properties are important include the following: 1) Close-coupled converters which are mounted closer to the engine for better conversion efficiency via higher gas temperatures (about 750° C.); 2) Diesel convertors and diesel particulate traps which operate at low temperatures and which are commonly pre-heated at 500° C. to pre-expand the intumescent mat prior to installation in the vehicle. This "pre-heating" would be unnecessary with the mounting mat of the present invention. 3) Heavy-duty truck converters and motorcycle converters which run at temperatures which greatly exceed 750° C. 4) Thin wall monoliths which will assist in meeting future EPA requirements via reaching operating temperature quicker due to their lighter mass. These monoliths are weak and will be crushed by the dramatic pressure increase of intumescent mounting mats.

Intumescent mounting mats would fail in the above cited severe condition application examples due to lack of expansion at low temperatures, to high pressure excursions between 300°–750° C., and to loss of pressure above 750° C. With lack of expansion or loss of pressure the fragile monolith would be released, rattle about within the can, and self-destruct due to mechanical shock. With high pressure excursions, low strength monoliths would be crushed.

Alternative mounting mats, such as those having intumescent sheet material stitch-bonded thereto as described in U.S. Pat. No. 4,929,429, have also been investigated for severe condition applications. However, these mats have been found to be difficult and cumbersome to handle and to fabricate into catalytic converter assemblies. The mounting materials proposed to accommodate the severe condition applications are themselves fragile, and require expensive preprocessing such as stitchbinding prior to installation. Moreover, the mounting material used may require combination with other mounting materials, such as intumescent sheets and backing layers, in order to provide sufficient strength for handleability. These mounting materials are generally very thick and lack structural integrity, even being handled in a bag to prevent crumbling. Thus they are difficult to cut to size for installation, and further must be compressed substantially to fit enough material needed for supportive mounting within the gap between the catalyst support structure and the housing. Consequently, "flashing" commonly occurs, with excess material being squeezed out of the housing.

Another alternative mounting mat is shown in U.S. Pat. No. 3,771,967. No stitchbinding is employed in for the mounting mat of this patent. Instead, this patent discloses that the ceramic fiber layer or ring which comprises the mounting mat may be impregnated with a binder and a rigidizer to adhere the fibrous mounting material to the metal housing or shell. This mounting mat, hardened with binder and rigidizer, lacks the flexibility necessary to prevent the support structure from being crushed or otherwise damaged during use in the extreme conditions noted hereinabove. Other examples of alternate approaches besides those described in U.S. Pat. Nos. 4,929,429 and 3,771,967, are found in U.S. Pat. Nos. 4,693,338 and 5,028,397.

Diesel particulate traps similarly include one or more porous tubular or honeycomb-like structures (having channels closed at one end, however) which are mounted by a thermally resistant material within a housing. Particulate is collected from exhaust gases in the porous structure until regenerated by a high temperature burnout procedure, which thermally taxes the mounting material.

SUMMARY OF THE INVENTION

It is an object of the present invention to provide a device for the treatment of exhaust gases which includes a mounting mat possessing good handleability and fabrication characteristics.

It is another object of the present invention to provide a device including a mounting mat, as above, the mounting mat being capable of withstanding high temperatures without degradation while maintaining stable pressure over a wide range of operating temperatures.

It is still another object of the present invention to provide a device including a substantially nonexpanding mounting mat, as above, wherein the mounting mat remains flexible and does not require the use of additional means to maintain its structural integrity.

The present invention provides a device for treatment of exhaust gases comprising:

(a) a housing having an inlet at one end and an outlet at its opposite end through which exhaust gases flow;
(b) a structure resiliently mounted within said housing, said structure having an outer surface and an inlet end surface at one end in communication with said inlet of said housing and an outlet end surf ace at its opposite end in communication with said outlet of said housing;
(c) mounting means, disposed between said structure and said housing, for selectively exerting substantially stable mounting pressure against said housing and said structure over a temperature range of about 20° C. to at least about 1200° C., wherein said mounting means is a flexible mounting mat in contact with and covering at least a portion of said outer surface of said structure and includes an integral, substantially non-expanding composite sheet of ceramic fibers and a binder, wherein said fibers are substantially shot free.

The mounting mat of the present invention may be used to mount any fragile or frangible structure, such as an automotive catalytic converter catalyst support monolith or diesel particulate trap, and the like, in all expected temperature environments where protection from thermal and mechanical shock is desirable. The mounting mat of the present invention maintains a near constant pressure over the entire operating range of all current and known future converter/trap designs. Throughout this specification, references to catalytic converters should be considered generally to apply to diesel particulate traps.

A method is provided by the present invention of mounting a fragile structure having at least one inlet face within a device having a housing to provide thermal insulation and mechanical shock resistance comprising: wrapping mounting means such as a flexible mounting mat comprising an integral, substantially nonexpanding composite sheet of ceramic fibers and binder around the entire perimeter of at least a portion of the structure's surfaces adjacent to the inlet face, and forming a housing around the wrapped structure and radially compressing the mounting mat between the structure and the housing, wherein the fibers are substantially shot free and wherein said mounting means is for exerting substantially stable pressure over an operating temperature range of about 20° C. to at least about 1200° C. For use in catalytic converters or diesel particulate traps, said composite sheet has an uninstalled nominal thickness of about 3 mm to about 30 mm, an uninstalled nominal density of about 0.03 to about 0.3 grams per cubic centimeter, and an installed thickness of about 2 mm to about 8 mm and a gap bulk density of about 0.1 to about 1.5 grams per cubic centimeter.

DETAILED DESCRIPTION OF THE INVENTION

Figure 1:
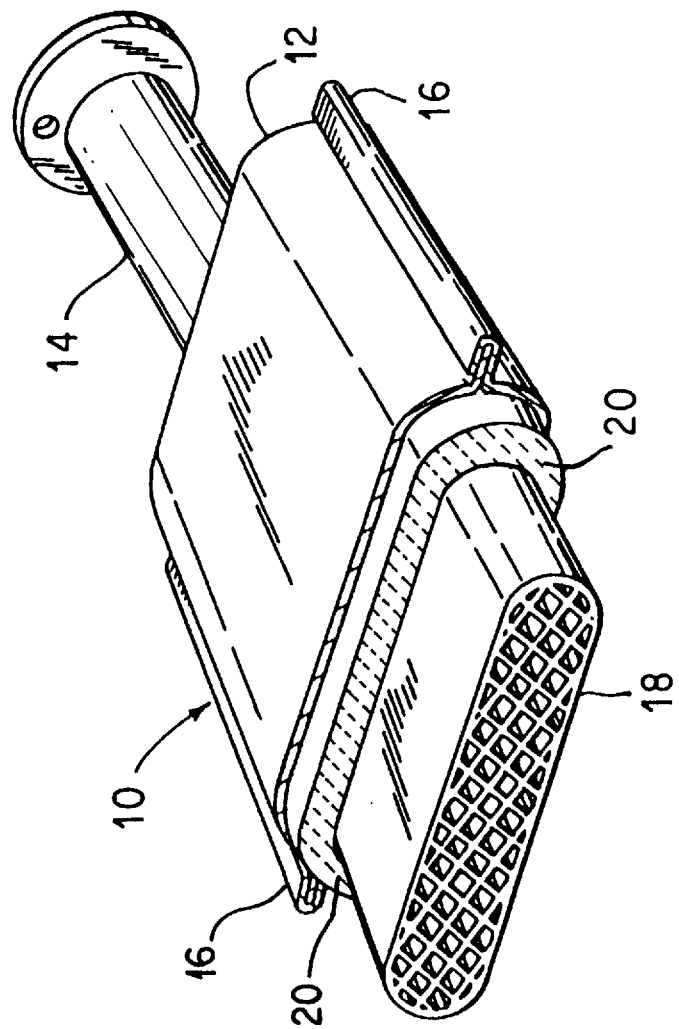
FIG. 1 is a fragmentary, elevational view of a catalytic converter according to the present invention.

One representative form of a device for treating exhaust gases is shown as a catalytic converter, generally designated by the numeral 10 in FIG. 1. It will be understood that the present invention is not intended to be limited to use in the catalytic converter shown, and so the shape is shown only as an example to illustrate the invention. In fact, as noted hereinabove, the mounting mat could be used to mount any fragile structure, such as a diesel particulate trap or the like. Nonautomotive applications for the mounting mat of the present invention include but are not limited to catalytic converters for chemical industry emission (exhaust) stacks. The term fragile structure is intended to mean and include structures such as metal or ceramic monoliths or the like which are fragile or frangible in nature and would benefit from a mounting mat such as is described herein.

Catalytic converter 10 includes a generally tubular housing 12 formed of two pieces of metal, e.g. high temperature-resistant steel. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18 which is supported and restrained within housing 12 by mounting means such as mat 20, to be further described. Monolith 18 includes a plurality of gas-pervious passages which extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

In accordance with the present invention, the monolith is spaced from its housing by a distance or a gap, which will vary according to the type and design of converter or trap utilized. This gap is filled with mounting mat 20 to provide resilient support to the ceramic monolith 18. The resilient mounting mat 20 provides both thermal insulation to the external environment and mechanical support to the catalyst support structure, protecting the fragile structure from mechanical shock. The mounting mat 20 also possesses good handleability and is easily processed in the fabrication of devices utilizing its capabilities of maintaining substantially stable pressure under compression in fixed gap conditions over a wide range of operating temperatures.

The mounting mat 20 comprises an integral, substantially non-expanding composite sheet of ceramic fibers and a binder. By "integral" is meant that after manufacture the mounting mat has self supporting structure, needing no reinforcing or containment layers of fabric, plastic or paper, (including those which are stitch-bonded to the mat) and can be handled or manipulated without disintegration. By "substantially non-expanding" is meant that the sheet does not readily expand upon the application of heat as would be expected with intumescent paper. Of course, some expansion of the sheet does occur based upon its thermal coefficient of expansion. The amount of expansion, however, is very insubstantial as compared to the expansion which occurs based upon intumescent properties. It will be appreciated that the mounting mat is substantially devoid of intumescent materials.

Ceramic fibers which are useful in the mounting mat of the present invention include polycrystalline oxide ceramic fibers such as mullite, alumina, high alumina aluminosilicates, aluminosilicates, zirconia, titania, chromium oxide and mixtures thereof. The ceramic fibers are preferably refractory. When the ceramic fiber is an aluminosilicate, the fiber may contain between about 55 to about 98% alumina and between about 2 to about 45% silica, with the preferred ratio of alumina to silica being between 70 to 30 and 75 to 25. Suitable polycrystalline oxide refractory ceramic fibers and methods for producing the same are contained in U.S. Pat. Nos. 4,159,205 and 4,277,269, which are incorporated herein by reference. FIBERMAX® polycrystalline mullite ceramic fibers are available from The Carborundum Company, Niagara Falls, N.Y. in blanket, mat or paper form.

The fibers used in the present invention are also characterized by being substantially shot free, having very low shot content, generally on the order of about 5 percent nominally or less. The diameters of fibers useful in the present invention are generally about 1 micron to about 10 microns.

The binder used in the present invention is typically an organic binder which is preferably sacrificial in nature. By "sacrificial" is meant that the binder will eventually be burned out of the mounting mat, leaving only the ceramic fibers as the final mounting mat.

Suitable binders include aqueous and nonaqueous binders, but preferably the binder utilized is a reactive, thermally setting latex which after cure is a flexible material that can be burned out of the installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Specific binders useful in the present invention include but are not limited to HISTRETCH V-60™, a trademark of B. F. Goodrich Co. (Akron, Ohio) for acrylonitrile based latex. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

The mounting mat of the present invention can be prepared by conventional papermaking techniques. Using this process, ceramic fibers are mixed with a binder to form a mixture or slurry. Any mixing means may be used, but preferably the fibrous components are mixed at about a 0.25% to 5% consistency or solids content (0.25–5 parts solids to 99.5–95 parts water). The slurry may then be diluted with water to enhance formation, and it may finally be flocculated with flocculating agent and drainage retention aid chemicals. Then, the flocculated mixture or slurry may be placed onto a papermaking machine to be formed into a ceramic paper mat. The mats or sheets may be formed by vacuum casting the slurry or mixture with conventional papermaking equipment and are typically dried in ovens. For a more detailed description of the standard papermaking techniques employed, see U.S. Pat. No. 3,458,329, the disclosure of which is incorporated herein by reference. This method typically breaks the fibers during processing. Accordingly the length of the fibers are generally about 0.025 cm to about 2.54 cm when this method is used.

Alternatively, the ceramic fibers may be processed into a mat by conventional means such as dry air laying. The mat at this stage, has very little structural integrity and is very thick relative to the conventional catalytic converter and diesel trap mounting mats.

Where this alternative technique is used, the mat may be further processed by the addition of a binder to the mat by impregnation to form a discontinuous fiber composite. In this technique, the binder is added after formation of the mat, rather than forming the mat prepreg as noted hereinabove with respect the conventional papermaking technique. This method of preparing the mat aids in maintaining fiber length by reducing breakage. Generally the length of the fibers are about 1 cm to about 10 cm, preferably about 1.25 cm to about 7.75 cm when this method is used.

Methods of impregnation of the mat with the binder include complete submersion of the mat in a liquid binder system, or alternatively spraying the mat. In a continuous procedure, a ceramic fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls which remove excess liquid and densify the prepreg to approximately its desired thickness.

The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

The resin loading level in the composite is generally on the order of about 0.5% to about 20%, and preferably is about 2% to about 7%. The compressed, bonded composite is flexible and has structural integrity and good handleability.

Regardless of which of the above-described techniques are employed, the composite can be cut, such as by die stamping, to form mounting mats of exact shapes and sizes with reproducible tolerances. The composite mounting mat may be bent back upon itself without cracking, due to its flexibility. This mounting mat 20 can be easily and flexibly fitted around the catalyst support structure 18 without cracking and fabricated into the catalytic converter housing 12 to form a resilient support for the catalyst support structure 18, with minimal or no flashing such as by extrusion or flow of excess material into the flange area 16. The handleability and processability of the mounting mat 20 will permit the fabrication of the catalytic converter assembly 10 to be substantially automated.

Having describe the invention is general terms, it is now illustrated in greater detail by way of an example. It will be understood that this Example is for illustration only and should not be considered limiting in any respect, unless otherwise stated.

EXAMPLE

A mounting mat composite was prepared in a batch mode by placing a 12 inch by 36 inch (30 cm by 91 cm) mat of FIBERMAX® polycrystalline ceramic fibers on a wax paper covered sheet of plexiglass in a container and pouring onto the mat a 3% solution of HI STRETCH V60™ acrylonitrile based latex in water, in an amount calculated to give a loading of 6.5% organics in the composite. An aluminum screen was pressed on top of the mat to extract excess binder solution, and was removed. Wax paper followed by plexiglass was placed over the mat to form a sandwich orientation, and the assembly was pressed in a Williams paper press to a thickness of 3/16 inch (about 0.5 cm). The glass and wax paper were removed and the impregnated mat was placed on a mold release-treated aluminum foil in an oven to dry at 145°–150° C. for 45 to 60 minutes. The dried composite was strong, flexible and easy to handle.

The mounting mat of the present invention generally has a nominal thickness (before compression during device assembly) of about 3 mm to about 30 mm. The nominal density, being the calculated density of the mounting mat without being compressed, is generally about 0.03 to about 0.3 grams per cubic centimeter.

When the mounting mat 20 is placed into the catalytic converter 10 during fabrication of the device, the mounting mat is radially compressed between the members of the housing 12 to a thickness corresponding to the gap between the housing 12 and the catalyst support structure 18, generally about 2 mm to about 8 mm, preferably about 2 mm to about 6 mm. This increases the density of the mounting mat, to its final gap bulk density, and results in the mounting mat exerting pressure under operating conditions against the adjacent elements 12 and 18. Depending upon the application, the mounting mats of the present invention can exert stable mounting pressures from about 0.1 Kg/cm$^2$ to about 50 kg/cm$^2$.

In operation, the catalytic converter experiences a significant change in temperature. Due to the differences in their thermal expansion coefficients, the housing 12 may expand more than the support structure 18, such that the gap between these elements will increase slightly. The thickness of mounting mat 20 is selected such that even at operating temperatures the gap is filled with mounting mat material, although at a slightly lower pressure than at ambient temperatures, to prevent the support structure 18 from vibrating loose. The substantially stable mounting pressure exerted by the mounting mat 20 under these conditions permits accommodation of the thermal characteristics of the assembly without compromising the physical integrity of the constituent elements.

Conventional intumescent mats may experience an increase of pressure of up to 800% upon heating to operating temperatures under standard test fixed gap conditions. Even in expanding gap conditions of normal operation, these conventional mats may crack fragile catalyst support structures. The mounting mat of the present invention maintains substantially stable mounting pressure under standard test fixed gap conditions, and may experience a slight decrease in pressure of up to about 30% in strenuous operating, expanding gap conditions at a given bulk density. The selection of bulk density for mounting mat 20 in a given application will maintain the necessary protective mounting pressure on the housing 12 and support structure 18.

Fixed gap pressure measurements are carried out in an enclosed furnace chamber having a roof orifice and a floor orifice. A pair of fused quartz rams are placed in the furnace, one per orifice. The quartz rams are of sufficient length to extend from the furnace's center to a distance beyond the furnace's exterior shell. At the center of the furnace the two quartz ram ends form the "fixed gap" between which the sample is placed. Outside the furnace the extending rams are rigidly mounted to load cells. The sample's pressure characteristics, in a specified fixed gap condition, are monitored by these load cells as the furnace is ramped upwards in temperature.

Figure 2:
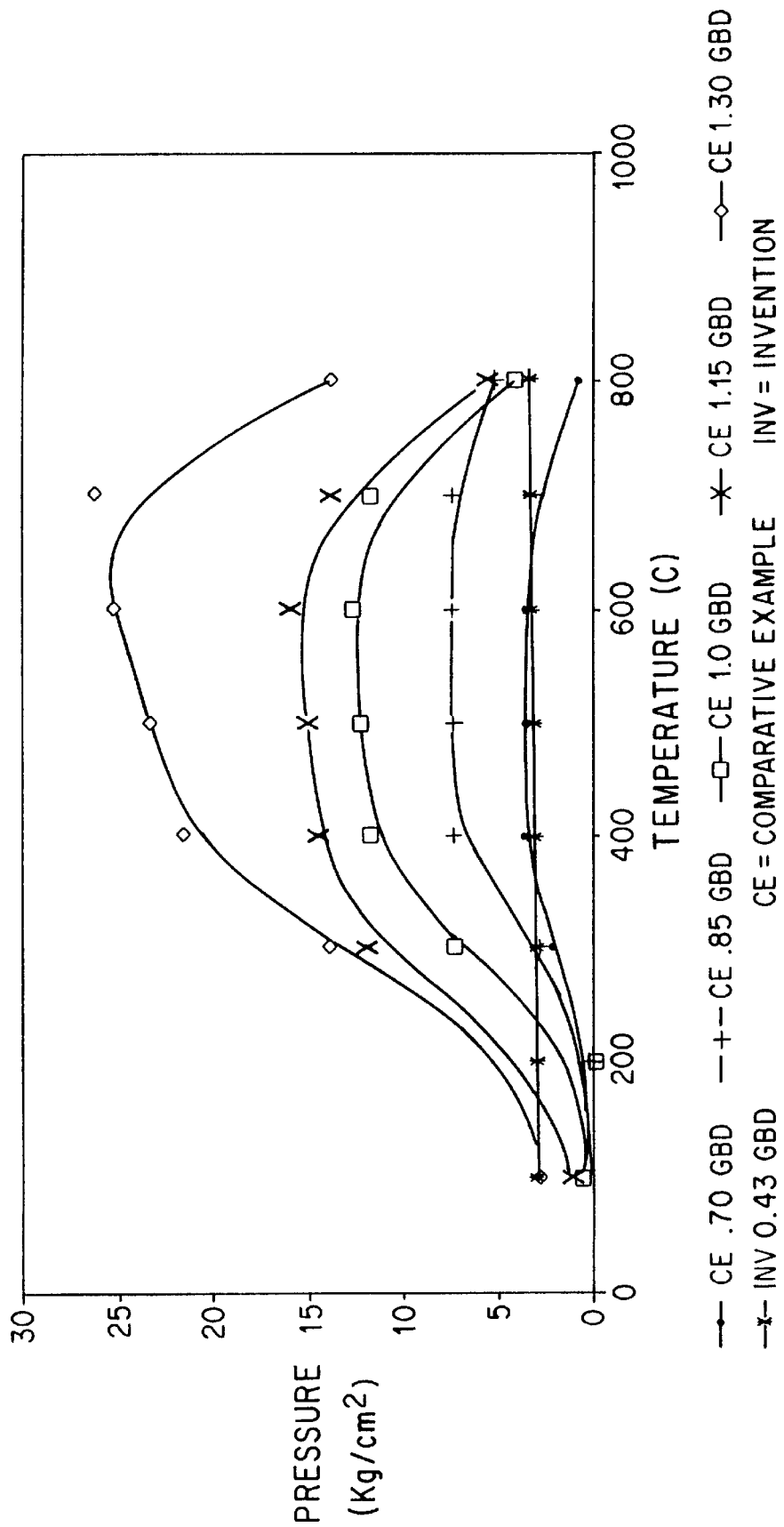
FIG. 2 is a graphical representation of pressure versus temperature for mounting mats of the present invention compared to conventional converter mats at various gap bulk densities.

FIG. 2 is a graph showing pressure of mounting mats according to the present invention as compared to intumescent papers at various gap bulk densities under fixed gap conditions. It is demonstrated that in the inventive device, the mounting mat will exert a stable, substantially constant mounting pressure over a wide temperature range as compared to conventional intumescent papers.

Figure 3:
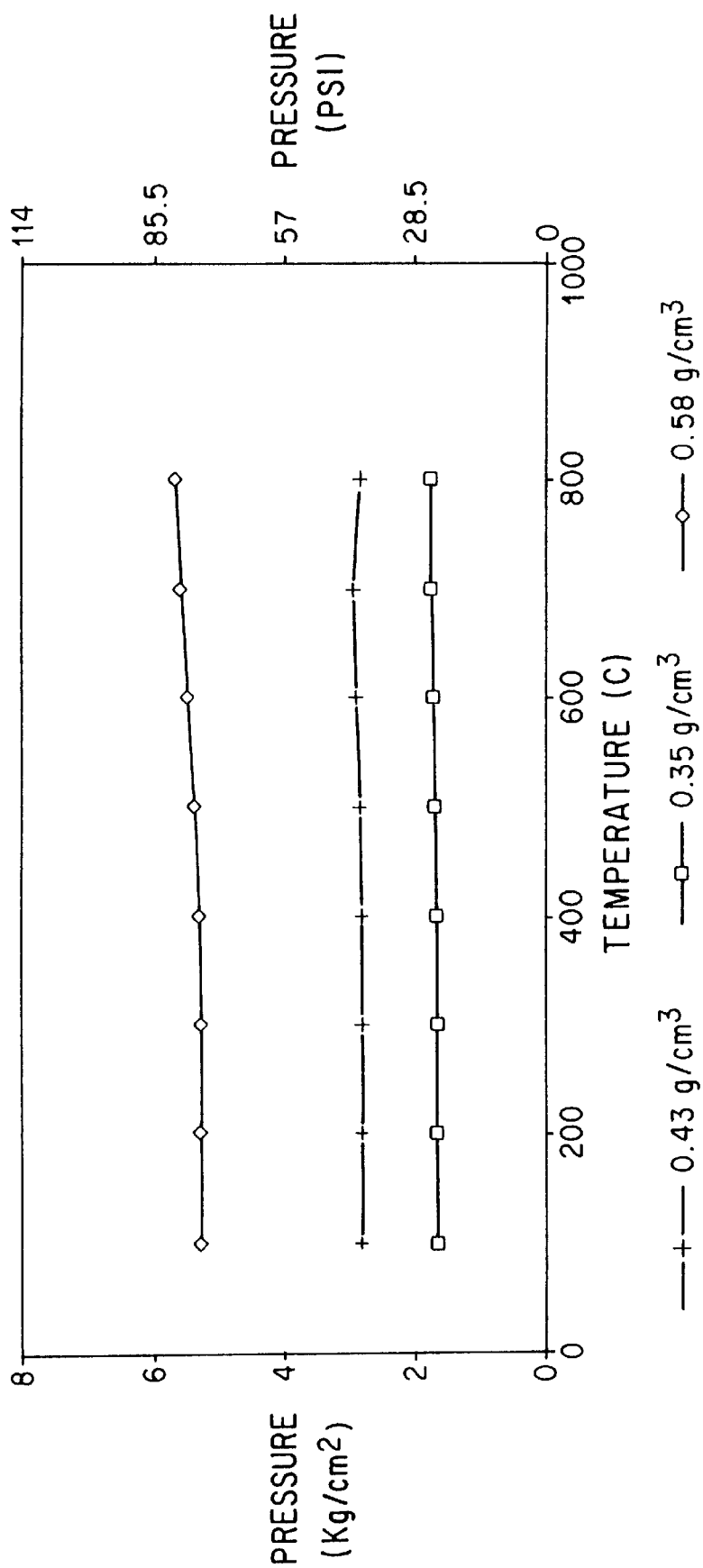
FIG. 3 is a graphical representation of pressure versus temperature for mounting mats of the present invention at various gap bulk densities.

FIG. 3 is a graph showing pressure of mounting mats to be used in a device according to the present invention over a range of temperatures under fixed gap conditions. Again, stable, substantially constant mounting pressure throughout the temperature range is demonstrated.

Unlike intumescent materials, such as vermiculite, the holding force on the support structure in the inventive device is generated by the resilient fibers in the mat, not the expansion of vermiculite. The dramatic expansion pressure increase during the initial thermal cycles observed using conventional catalytic converter mounting materials are not observed using a mounting mat according to the present invention. In fact, the mounting mat according to the invention will function until the limit of the fibers is reached, at approximately 1650° C. for aluminosilicate ceramic fibers.

A mounting mat according to the present invention was prepared from FIBERMAX® polycrystalline ceramic fibers and tested for hot gas erosion resistance using the traditional procedure used to measure conventional converter mats. The test conditions were maintaining an oven temperature of 600° C. while pulsing air 2.0 seconds on and 0.5 seconds off, at an air velocity of 300 meters per second. Conventional intumescent paper mats eroded 2.54 cm in 2 to 82 hours, while the mounting mat of the present invention showed no erosion in 100 hours of testing.

The superior physical property characteristics demonstrated by the mounting mats of the present invention over conventional converter/diesel trap mats, such as high erosion resistance and substantially constant, stable pressure over a wide temperature range, are desirable in both catalytic converter and diesel trap designs. The mounting mats can be die cut and are additionally operable as resilient supports in a thin profile, providing ease of handling, and in a flexible form, so as to be able to provide a total wrap of the catalyst support structure without cracking. Alternatively, the mounting mat may be integrally wrapped about the entire circumference or perimeter of at least a portion of the catalyst support structure. The mounting mat may eliminate the need for an end-seal currently used in conventional converter devices to prevent gas by-pass.

The mounting mat of the present invention is useful in applications such as catalytic converters or diesel particulate traps which utilize low strength monoliths and/or experience either unconventionally low operating temperatures (less than about 300° C.) or high operating temperatures (above about 750° C.), as well as traditional mounting mat applications which currently use difficult to handle containment/fiber blanket forms.

The mounting mat of the present invention can also be used in catalytic converters employed the chemical industry which are located within exhaust or emission stacks, and which also contain fragile honeycomb type structures to be protectively mounted.

Thus, the objects of the invention are accomplished by the present invention, which is not limited to the specific embodiments described above, but which includes variations, modifications and equivalent embodiments defined by the following claims.

We claim:

1. A diesel particulate trap for the treatment of exhaust gases comprising:

(a) a housing through which exhaust gases flow;

(b) a porous structure for collecting particulate from the exhaust gases, resiliently mounted within said housing;

(c) mounting means, disposed between said structure and said housing, for selectively exerting substantially stable mounting pressure against said housing and said structure over a temperature range of from about 20° C. to at least about 1200° C., wherein said mounting means is a flexible mounting mat in contact with and covering at least a portion of an outer surface of said structure and includes an integral, substantially non-expanding sheet of ceramic fibers, wherein said fibers are substantially shot free.

2. The diesel particulate trap as in claim 1 wherein said flexible mounting mat is integrally wrapped about an entire perimeter of at least a portion of said structure.

3. The diesel particulate trap as in claim 1 wherein said fibers are selected from the group consisting of alumina, mullite, high alumina aluminosilicates, aluminosilicates, zirconia, titania, chromium oxide and mixtures thereof.

4. The diesel particulate trap as in claim 3 wherein said fibers are aluminosilicate comprising about 55% to about 98% alumina and about 2% to about 45% silica.

5. The diesel particulate trap as in claim 3 wherein said fibers are mullite.

6. The diesel particulate trap as in claim 1 wherein said mounting mat is compressed to an installed thickness of about 2 mm to about 8 mm.

7. The diesel particulate trap of claim 1 wherein said mounting means is constructed and arranged to exert a pressure of between about 0.1 kg/cm$^2$ and about 50 kg/cm$^2$ against said housing and said structure.

8. The diesel particulate trap as in claim 1 wherein said sheet has a nominal thickness of about 3 mm to about 30 mm, and a nominal density of about 0.03 to about 0.3 grams per cubic centimeter.

9. The diesel particulate trap as in claim 1 wherein said ceramic fibers have diameters in the range of about 1 micron to about 10 microns.

10. The diesel particulate trap as in claim 1 wherein said ceramic fibers have less than about 5% shot.

11. The diesel particulate trap as in claim 1 wherein said mounting mat further includes a sacrificial binder selected from the group consisting of latexes of acrylics, styrene-butadiene, vinylpyridine, acrylonitrile, vinyl chloride and polyurethane.

12. The diesel particulate trap as in claim 1 wherein said mounting mat includes a sacrificial, flexible thermosetting resin binder selected from the group consisting of unsaturated polyesters, epoxies and polyvinyl esters.

13. The diesel particulate trap as in claim 1 wherein said fibers have an average length in the range of about 0.025 cm to about 2.54 cm.

14. The diesel particulate trap as in claim 1 wherein said fibers have an average length in the range of about 1 cm to about 10 cm.

* * * * *